United States Patent Office 2,814,884
Patented Dec. 3, 1957

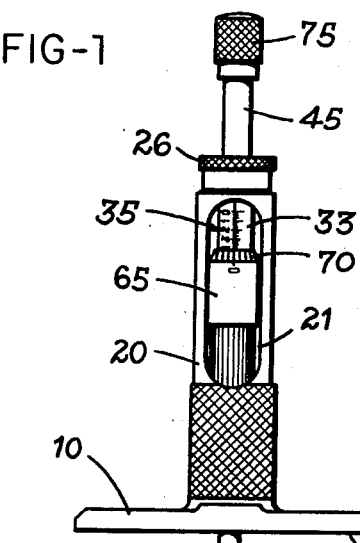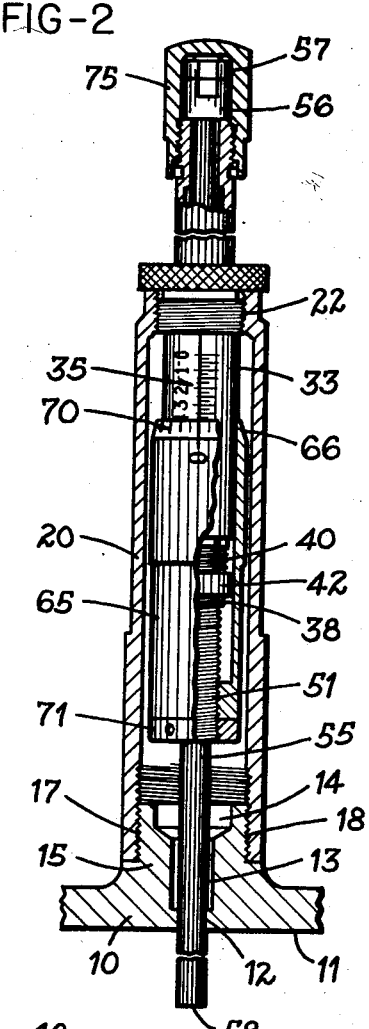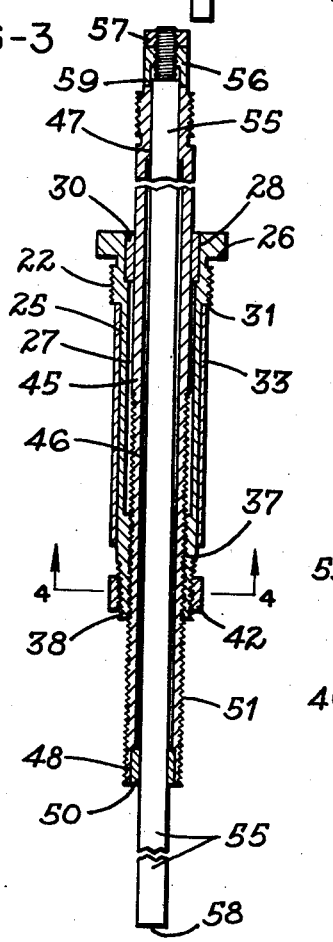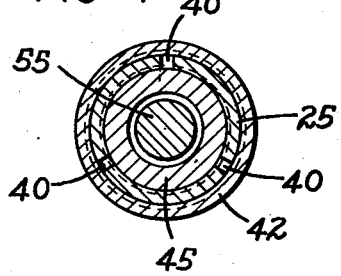
INVENTOR.
MILLARD E. BOTNER

2,814,884

MICROMETER DEPTH GAGE

Millard E. Botner, Middletown, Ohio

Application January 13, 1956, Serial No. 559,069

2 Claims. (Cl. 33—170)

This invention relates to depth measuring micrometers of the type having a flat base for engaging a surface from which the measurement is to be made and a measuring rod extended from the base to engage the surface whose depth it is desired to determine.

In the ordinary type of micrometer depth gage, the barrel upon which is scribed a graduated scale and the thimble, which surrounds the barrel and is moved longitudinally thereof as the measuring rod is extended from the base of the gage, are so arranged that the thimble covers that portion of the scale which indicates the depth measurement. This situation gives rise to errors in reading the gage since a person using it must always bear in mind that the numeral on the scale nearest to the end of the thimble is not the figure corresponding to the depth as measured by the gage, but that it is this numeral minus one which is the correct reading. While this is hardly a difficult calculation to make, it does cause many errors since a person using the gage is often making many measurements within a short period of time and is required to work quite rapidly, thus making the inverse reading of the gage a serious detriment to quick and accurate measurement and reading.

The present invention eliminates the requirement of inverse reading as just described by providing a micrometer depth gage in which the scale is progressively uncovered as the measuring rod is fed outwardly from the base of the instrument, thereby providing for direct reading from the scale of the setting of the gage.

A micrometer must by its nature be an extremely accurate instrument, and there can be no compromises in manufacture between processes which result in fairly high tolerances and those processes which give the requisite close tolerances. If the instrument is to operate properly tolerances must be kept as low as possible, but at the same time, consideration must be given to the question of how the instrument can be manufactured on a mass production basis while maintaining the required tolerances.

Furthermore, this type of instrument is subject to extremely hard use in many applications. For example, when used on a production line to take depth measurements on a device which must be maintained within certain standards, the gage may be adjusted thousands of times in one day. This constant adjustment results in inevitable wear of the feed screw of the depth gage, with consequent inaccuracy of the gage which may become quite detrimental in applications where limit or tolerances must be maintained within fractions of 0.001 of an inch. Inaccuracy in these instances is of course not permissible, and if there is no means for removing the play in the instrument resulting from such wear, it must be either discarded or rebuilt.

The present invention also obviates these difficulties by providing a micrometer depth gage wherein the parts which must be resistant to wear may be made of extremely hard and wear resistant material, but wherein only a minimum of such material which is quite expensive, is required. Further, an adjustment is provided within the instrument to allow the user to remove play from the feed screw mechanism of the gage as it is used and thereby to increase the useful life of the gage.

It is therefore a primary object of this invention to provide a micrometer depth gage of improved novel and rugged construction in which the depth indicating scale is progressively uncovered as the measuring rod is fed outwardly from the base of the gage to afford direct reading of the gage scale.

Another object of the invention is to provide such a gage in which the parts subject to wear after continued use may be made of hard, wear-resistant material but wherein only a minimum of such material is required.

A further object of the invention is to provide such a gage wherein the moving parts are substantially enclosed to prevent collection of dust, dirt, or other abrasive substances thereon.

An additional object of this invention is to provide such a gage which is readily adaptable to mass production operations and techniques without sacrificing the close tolerances necessary to maintain the proper quality of the instrument.

Other objects and advantages of the invention will be apparent from the following description, the accompanying drawing and the appended claims.

In the drawing—

Fig. 1 is a side elevation of the micrometer depth gage provided by this invention;

Fig. 2 is an enlarged view partly in section and partly in elevation of the gage seen in Fig. 1;

Fig. 3 is a sectional view of the parts seen in elevation in Fig. 2; and

Fig. 4 is an enlarged section taken on line 4—4 of Fig 3.

Referring to the drawing, which illustrates a preferred embodiment of the invention, the depth gage includes a base 10 having a flat lower surface 11 and a bore 12 (Fig. 2) through said base substantially perpendicular to the lower surface and counterbored at 13, and having a larger counterbored and countersunk portion 14 within a boss 15 projecting from the upper surface of the base. Boss 15 is externally threaded at 17 to receive the internal threads 18 of a tubular body 20 which is provided at opposite sides with elongated openings 21 extending over a substantial portion of its length. The upper end of the body 20, opposite from base 10, is threadedly connected at 22 with a sleeve 25 which extends coaxially within body 20 and across the greater portion of openings 21. This sleeve is accurately located within the body by a circumferential shoulder 26 which seats on the upper end of body 20, and includes central bore 27 (Fig. 3) which is counterbored at 28 to receive a bearing insert 30.

A shoulder 31 extends outwardly from the sleeve 25 adjacent its upper threaded connector portion 22 to provide an annular stop for a barrel 33 which is press fitted upon the sleeve and upon which is scribed a graduated scale 35. At the opposite end of the sleeve from bearing insert 30 there is an internal thread 37 and a short external tapered thread 38. A number of longitudinal slits 40 (Fig. 4) extend substantially the same length along the sleeve as the tapered thread 38, and a wear nut 42 having an internal tapered thread fits around tapered thread 38 for a purpose to be presently described. A hollow spindle 45 is received within sleeve 25 and is provided with a central bore 46, a smaller bore 47 at its upper end, and a larger counterbore 48 at its lower end within which is received a bearing insert 50. The spindle is threaded at 51 along a major portion of its length adjacent its lower end, this thread matching the internal thread 37 of the sleeve so that rotation of the spindle will result in its being fed inwardly or outwardly with respect to the sleeve.

A measuring rod 55 is received within the spindle, engaging the lower bearing 50 and the smaller upper bore 47, which acts as an upper bearing, to support the rod rigidly within the spindle. The upper end of the rod 55 is threaded to receive a pair of lock nuts 56 and 57 which are pre-set upon the rod at a standard distance from the lower end 58 thereof, and the rod 55 extends through bore 12 in the base so that its lower end 58 provides the measuring surface for engaging the bottom of a hole or some other surface the depth of which is to be determined. The lowermost lock nut 56 preferably includes a downwardly extending cylindrical skirt 59 which covers the threads at the end of rod 55 and keeps these threads free of dirt and grime.

The lower end of the spindle 45 carries a tubular thimble 65 provided at its upper tapered edge 66 with a peripheral scale 70. The thimble 65 is held in fixed relation to spindle 45 by a lock nut 71 which is received upon threaded portion 51 of the spindle. Lock nut 71 is tightened against the lower end of thimble 65 to prevent rotation of the thimble on spindle 45 and at the same time to provide for alignment of scales 35 and 70 when regulating the instrument.

A cap 75 is threaded upon the upper end of the spindle 45 and the closed upper end of this cap engages the upper end of the measuring rod 55 to force the rod downward until the lock nut 56 thereon is seated upon the upper end of the spindle, thus securing the measuring rod to the spindle in axially fixed relation with the scale-bearing sleeve 25 and providing for movement of the rod inwardly or outwardly of bore 12 with respect to base 10 upon threading of the spindle 45 into or out of sleeve 25. Since the thimble 65 is locked to the lower end of the spindle, rotation of the thimble results in movement of the measuring rod.

The internal diameter and axial length of thimble 65 are such that when the lower surface 58 of the measuring rod is flush with lower base surface 11, scale 70 approximately coincides with the zero mark on scale 35 and the barrel 33 is substantially enveloped by the thimble. The zero marks on the two scales are brought into accurate registry by threaded adjustment of the thimble on the spindle, and the thimble is locked in such adjusted position by the lock nut 71. Then in use as the measuring rod is fed outwardly of the base, the thimble progressively uncovers portions of scale 35 in proportion to the axial length of the measuring rod extended below lower base surface 11, and the reading of the two scales 35 and 70 is directly indicative of the setting of the gage.

After continued use, the mating threads 37 and 51 may tend to wear, in which case play may develop in the gage resulting in inaccurate measurements. By partially disassembling the gage and removing the thimble 65, the operator may tighten wear nut 42 inwardly upon tapered thread 38, thus drawing the slit lower end portion of the spindle radially inwardly and tightening the engagement of the mating thread portions 37 and 50 to compensate for wear. Spindle 45, bearing inserts 30 and 50, and at least the lower lock nut 56 may be made of extremely hard and wear-resistant metal which will greatly prolong the useful life of the gage. On the other hand, the barrel 33 and thimble 65, upon which are scribed respectively scales 35 and 70, may be made of softer material for ease of applying these scales since neither the barrel nor the thimble is affected by wear erosion during the use of the instrument.

It will thus be seen that the present invention provides a micrometer depth gage which may be readily produced on a mass production basis, which can incorporate high quality wear resistant material in its parts subject to wear erosion without excessive use of such material, which is relatively simple and inexpensive to manufacture and assemble, and which is reliable and accurate even after extended use. The parts of the instrument may be machined by conventional methods to within very close tolerances, as required by the nature of the instrument, and these parts can be assembled and will be maintained in accurate concentric relation and will operate with a minimum of binding and internal friction. Furthermore, the construction is such as to shield all parts subject to wear from collections of dust or other abrasive material, and thus to prevent any substantial deposit of dust or other abrasives upon these parts. Also, the direct reading provision on the scale eliminates the possibility of reading errors as previously explained.

Several examples of the adaptability of the present construction to high volume production with conventional machinery might be noted as follows. In order to assure that the openings 21 are properly aligned with respect to base 10, it is advisable to fit the body 20 to the base before machining the openings 21 into the hollow body member 20. This may be done by merely boring the stock from which the body member is machined to the proper depth along most of its length, then tapping the lower end to provide the internal threads 14. The boss portion 15 of the base may be turned down and threaded at 17 to fit within the internal threads 18 on the body, and these two members may then be assembled and force fit together, and in such assembled relation mounted in a suitable device such as a milling machine for forming the openings 21 in the sides of body 20 in proper relation with respect to the sides of base 10.

Furthermore, it is desirable that the spindle move exactly along the longitudinal axis of sleeve 25, and that rod 55 be held perfectly concentric with respect to the spindle. A twist drill of the type used to form the bores in these members will run out of line approximately 0.004 inch per inch, and thus it is impossible to perform the boring operations required in the manufacture of this instrument with a degree of accuracy sufficient to make such bores within the required limits. Applicant has overcome this difficulty by providing a series of slightly oversize bores and counterbores, and utilizing only short bores and short insert bearing sleeves at the points where bearing surfaces are required, for example bearing sleeves 30 and 50, and bearing surfaces 12 and 47. Thus, it is possible to produce this instrument on conventional machine tools adapted to high speed mass production operations.

This application is a continuation-in-part of my copending application Serial No. 464,797, filed October 26, 1954, now abandoned.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A direct reading micrometer depth gage including in combination a spindle having a central bore therethrough, a measuring rod greater in length than said spindle and receivable in said bore in spaced relation with the surface of said bore, said spindle having bearing surfaces at opposite ends thereof for engaging and supporting said rod in exact coaxial relation therewithin, a lock nut threaded on one end of said rod at a predetermined distance from the other end of said rod, a cap covering said lock nut and threadedly engaging the end of said spindle adjacent said lock nut to hold said lock nut in seated relation with said end of said spindle with resulting securing of said rod in predetermined axial position within said spindle, said spindle also being externally threaded at its other end, a sleeve surrounding said spindle and having an internally threaded portion for receiving said last named end of said spindle and a bearing for engaging the first named end of said spindle, a barrel having a graduated scale on its outer surface secured about said sleeve, a tubular thimble attached to said last named end of said spindle in telescoping relation with said barrel for progressively uncovering portions of said scale as said rod is fed outwardly of said sleeve by threaded movement of said spindle in said sleeve, said thimble having a peripheral scale about the end thereof cooperating with said graduated scale on said barrel, means for adjusting the fixed relation between said thimble and said spindle to align said scales with each other, a body including a tubular portion surrounding said sleeve and fixed thereto opposite said thimble, said body having an opening therein for viewing said scales, and a base on said body including a bore for passage of said rod therethrough, said rod being maintained in exact alignment with said bore in said body by said bearing surfaces in said spindle to eliminate friction between said rod and said bore in said body.

2. A direct reading micrometer depth gage including in combination a spindle having a central bore therethrough, a measuring rod greater in length than said spindle and receivable in said bore in spaced relation with the surface of said bore, said spindle having bearing surfaces at opposite ends thereof for engaging and supporting said rod in exact coaxial relation therewithin, a lock means on one end of said rod at a predetermined distance from the other end of said rod, a cap covering said lock means and positively engaging the end of said spindle adjacent said lock means to hold said lock means in seated relation with said end of said spindle with resulting securing of said rod in predetermined axial position within said spindle, said spindle also being externally threaded at its other end, a sleeve surrounding said spindle and having an internally threaded portion for receiving said last named end of said spindle and a bearing for engaging the first named end of said spindle, a barrel having a graduated scale on its outer surface secured about said sleeve, a tubular thimble attached to said last named end of said spindle in telescoping relation with said barrel for progressively uncovering portions of said scale as said rod is fed outwardly of said sleeve by threaded movement of said spindle in said sleeve, said thimble having a peripheral scale about the end thereof cooperating with said graduated scale on said barrel, means for adjusting the fixed relation between said thimble and said spindle to align said scales with each other, a body including a tubular portion surrounding said sleeve and fixed thereto opposite said thimble, said body having an opening therein for viewing said scales, and a base on said body including a bore for passage of said rod therethrough, said rod being maintained in exact alignment with said bore in said body by said bearing surfaces in said spindle to eliminate friction between said rod and said bore in said body.

References Cited in the file of this patent

UNITED STATES PATENTS

| | | |
|---|---|---|
| 1,070,816 | Kunik | Aug. 19, 1913 |
| 1,431,583 | Johansson | Oct. 10, 1922 |
| 1,817,622 | Hansen | Aug. 4, 1931 |
| 2,303,858 | Ostberg | Dec. 1, 1942 |
| 2,520,022 | Vobeda | Aug. 22, 1950 |

FOREIGN PATENTS

| | | |
|---|---|---|
| 902,571 | France | Dec. 15, 1944 |
| 248,842 | Switzerland | Feb. 16, 1948 |
| 455,207 | Italy | Feb. 17, 1950 |